(12) United States Patent
Gusikhin et al.

(10) Patent No.: US 8,594,616 B2
(45) Date of Patent: Nov. 26, 2013

(54) VEHICLE KEY FOB WITH EMERGENCY ASSISTANT SERVICE

(75) Inventors: Oleg Yurievitch Gusikhin, West Bloomfield, MI (US); Perry Robinson MacNeille, Lathrup Village, MI (US); Edward Andrew Pleet, Livonia, MI (US); David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/414,791

(22) Filed: Mar. 8, 2012

(65) Prior Publication Data

US 2013/0237174 A1    Sep. 12, 2013

(51) Int. Cl.
*H04M 11/04*    (2006.01)
*H04W 24/00*    (2009.01)

(52) U.S. Cl.
USPC ............... 455/404.1; 455/425; 340/426.2

(58) Field of Classification Search
USPC ............ 455/404.1–404.2, 425, 552.1, 553.1, 455/556.1, 564, 569.2, 575.2, 345; 340/425.5–426.36
See application file for complete search history.

(56) References Cited

U.S. PATENT DOCUMENTS

| | | | |
|---|---|---|---|
| 4,442,485 A | 4/1984 | Ota et al. | |
| 4,833,477 A | 5/1989 | Tendler | |
| 4,937,796 A | 6/1990 | Tendler | |
| 5,144,323 A | 9/1992 | Yonkers | |
| 5,223,844 A | 6/1993 | Mansell et al. | |
| 5,388,147 A | 2/1995 | Grimes | |
| 5,515,043 A | 5/1996 | Bernard et al. | |
| 5,555,286 A | 9/1996 | Tendler | |
| 5,598,460 A | 1/1997 | Tendler | |
| 5,649,059 A | 7/1997 | Tendler et al. | |
| 5,736,962 A | 4/1998 | Tendler | |
| 5,825,098 A | 10/1998 | Darby et al. | |
| 5,918,180 A | 6/1999 | Dimino | |

(Continued)

FOREIGN PATENT DOCUMENTS

| | | |
|---|---|---|
| EP | 1507129 | 2/2005 |
| EP | 2093982 | 12/2007 |
| EP | 2219163 | 1/2009 |
| WO | 2008011432 | 1/2008 |

OTHER PUBLICATIONS

Kermit Whitfield, "A hitchhiker's guide to the telematics ecosystem", Automotive Design & Production, Oct 2003, http://findarticles.com, pp. 1-3.

(Continued)

*Primary Examiner* — George Eng
*Assistant Examiner* — Marcus Hammonds
(74) *Attorney, Agent, or Firm* — Jennifer M. Stec; Brooks Kushman P.C.

(57) ABSTRACT

The illustrative embodiment contains a key fob configured to communicate wirelessly with a vehicle and a communication network. The key fob further includes, a first transceiver configured to communicate data to the vehicle to allow access and operation of the vehicle and to receive data indicating that an emergency event has been detected at the vehicle. The key fob also includes a second transceiver configured to access a telecommunications network. Additionally, the key fob contains a circuit configured to cause the second transmitter to automatically dial a 911 operator in the event the data received by the transceiver indicates that an emergency event has been detected at the vehicle.

18 Claims, 6 Drawing Sheets

(56) References Cited

U.S. PATENT DOCUMENTS

| | | |
|---|---|---|
| 6,014,555 A | 1/2000 | Tendler |
| 6,073,004 A | 6/2000 | Balachandran |
| 6,151,385 A | 11/2000 | Reich et al. |
| 6,266,617 B1 | 7/2001 | Evans |
| 6,275,713 B1 | 8/2001 | Toda |
| 6,292,551 B1 | 9/2001 | Entman et al. |
| 6,496,107 B1 | 12/2002 | Himmelstein |
| 6,504,909 B1 | 1/2003 | Cook et al. |
| 6,516,198 B1 | 2/2003 | Tendler |
| 6,519,463 B2 | 2/2003 | Tendler |
| 6,532,372 B1 | 3/2003 | Hwang |
| 6,608,887 B1 | 8/2003 | Reksten et al. |
| 6,647,270 B1 | 11/2003 | Himmelstein |
| 6,680,998 B1 | 1/2004 | Bell et al. |
| 6,757,528 B1 | 6/2004 | Cardina et al. |
| 6,775,356 B2 | 8/2004 | Salvucci et al. |
| 6,778,820 B2 | 8/2004 | Tendler |
| 6,952,155 B2 | 10/2005 | Himmelstein |
| 7,027,842 B2 | 4/2006 | Zhang et al. |
| 7,034,238 B2 | 4/2006 | Uleski et al. |
| 7,050,818 B2 | 5/2006 | Tendler |
| 7,092,723 B2 | 8/2006 | Himmelstein |
| 7,113,091 B2 | 9/2006 | Script et al. |
| 7,119,669 B2 | 10/2006 | Lundsgaard et al. |
| 7,123,926 B2 | 10/2006 | Himmelstein |
| 7,139,549 B2 | 11/2006 | Islam et al. |
| 7,164,921 B2 | 1/2007 | Owens et al. |
| 7,228,145 B2 | 6/2007 | Burritt et al. |
| 7,305,243 B1 | 12/2007 | Tendler |
| 7,400,886 B2 | 7/2008 | Sahim et al. |
| 7,447,508 B1 | 11/2008 | Tendler |
| 7,450,955 B2 | 11/2008 | Himmelstein |
| 7,463,896 B2 | 12/2008 | Himmelstein |
| 7,479,900 B2 | 1/2009 | Horstemeyer |
| 7,482,952 B2 | 1/2009 | Horstemeyer |
| 7,505,772 B2 | 3/2009 | Himmelstein |
| 7,536,189 B2 | 5/2009 | Himmelstein |
| 7,548,158 B2 | 6/2009 | Titus et al. |
| 7,574,195 B2 | 8/2009 | Krasner et al. |
| 7,580,697 B2 | 8/2009 | Lappe et al. |
| 7,580,782 B2 | 8/2009 | Breed et al. |
| 7,596,391 B2 | 9/2009 | Himmelstein |
| 7,599,715 B2 | 10/2009 | Himmelstein |
| 7,626,490 B2 | 12/2009 | Kashima |
| 7,706,796 B2 | 4/2010 | Rimoni et al. |
| 7,747,291 B2 | 6/2010 | Himmelstein |
| 7,783,304 B2 | 8/2010 | Himmelstein |
| 7,825,901 B2 | 11/2010 | Potera |
| 7,844,282 B1 | 11/2010 | Tendler |
| 7,885,685 B2 | 2/2011 | Himmelstein |
| 7,894,592 B2 | 2/2011 | Book et al. |
| 7,907,976 B2 | 3/2011 | Himmelstein |
| 7,957,772 B2 | 6/2011 | Charlier et al. |
| 8,036,634 B2 | 10/2011 | Dimeo et al. |
| 8,060,117 B1 | 11/2011 | Tendler |
| 8,224,346 B2 | 7/2012 | Himmelstein |
| 8,396,447 B2 | 3/2013 | Reich et al. |
| 2001/0044302 A1 | 11/2001 | Okuyama |
| 2002/0086718 A1 | 7/2002 | Bigwood et al. |
| 2003/0227381 A1* | 12/2003 | Best, Jr. ............... 340/531 |
| 2003/0231550 A1 | 12/2003 | MacFarlane |
| 2004/0162064 A1 | 8/2004 | Himmelstein |
| 2004/0183671 A1 | 9/2004 | Long |
| 2005/0037730 A1 | 2/2005 | Montague |
| 2005/0048948 A1 | 3/2005 | Holland et al. |
| 2005/0099275 A1* | 5/2005 | Kamdar et al. .......... 340/426.18 |
| 2005/0119030 A1 | 6/2005 | Bauchot et al. |
| 2005/0197174 A1* | 9/2005 | Hasan et al. ............... 455/575.9 |
| 2005/0222933 A1 | 10/2005 | Wesby |
| 2005/0275505 A1 | 12/2005 | Himmelstein |
| 2006/0049922 A1* | 3/2006 | Kolpasky et al. ........ 340/426.13 |
| 2006/0061483 A1* | 3/2006 | Smith et al. ............. 340/825.72 |
| 2006/0071804 A1 | 4/2006 | Yoshioka |
| 2006/0165015 A1 | 7/2006 | Melick et al. |
| 2006/0217105 A1 | 9/2006 | Kumar et al. |
| 2006/0224305 A1 | 10/2006 | Ansari et al. |
| 2006/0262103 A1 | 11/2006 | Hu et al. |
| 2006/0288053 A1 | 12/2006 | Holt et al. |
| 2007/0050248 A1 | 3/2007 | Huang et al. |
| 2007/0053513 A1 | 3/2007 | Hoffberg |
| 2007/0142028 A1 | 6/2007 | Ayoub et al. |
| 2007/0171854 A1 | 7/2007 | Chen et al. |
| 2007/0203643 A1 | 8/2007 | Ramaswamy et al. |
| 2007/0218923 A1 | 9/2007 | Park et al. |
| 2007/0243853 A1 | 10/2007 | Bumiller et al. |
| 2007/0264990 A1 | 11/2007 | Droste et al. |
| 2007/0281603 A1 | 12/2007 | Nath et al. |
| 2008/0039018 A1 | 2/2008 | Kim |
| 2008/0080687 A1 | 4/2008 | Broms |
| 2008/0139118 A1 | 6/2008 | Sanguinetti |
| 2008/0140665 A1 | 6/2008 | Ariel et al. |
| 2008/0143497 A1 | 6/2008 | Wasson et al. |
| 2008/0150683 A1 | 6/2008 | Mikan et al. |
| 2008/0177541 A1 | 7/2008 | Satomura |
| 2008/0180237 A1 | 7/2008 | Fayyad et al. |
| 2008/0208446 A1 | 8/2008 | Geelen et al. |
| 2008/0243545 A1 | 10/2008 | D'Ambrosia et al. |
| 2009/0002145 A1 | 1/2009 | Berry et al. |
| 2009/0099732 A1 | 4/2009 | Pisz |
| 2009/0149153 A1 | 6/2009 | Lee |
| 2009/0160607 A1 | 6/2009 | Edwards et al. |
| 2009/0161836 A1 | 6/2009 | Oesterling |
| 2009/0164053 A1 | 6/2009 | Oesterling |
| 2009/0186596 A1 | 7/2009 | Kaltsukis |
| 2009/0187300 A1 | 7/2009 | Everitt et al. |
| 2009/0253403 A1 | 10/2009 | Edge et al. |
| 2009/0261958 A1 | 10/2009 | Sundararajan |
| 2009/0286504 A1* | 11/2009 | Krasner et al. .............. 455/404.1 |
| 2010/0035598 A1* | 2/2010 | Lee et al. ...................... 455/421 |
| 2010/0058333 A1 | 3/2010 | Peterson |
| 2010/0069018 A1 | 3/2010 | Simmons et al. |
| 2010/0076764 A1 | 3/2010 | Chengalvaraya |
| 2010/0097239 A1 | 4/2010 | Campbell et al. |
| 2010/0190479 A1 | 7/2010 | Scott et al. |
| 2010/0202368 A1 | 8/2010 | Hans |
| 2010/0210211 A1* | 8/2010 | Price ........................... 455/41.3 |
| 2010/0227582 A1 | 9/2010 | Berry et al. |
| 2010/0227584 A1 | 9/2010 | Hong |
| 2010/0240337 A1* | 9/2010 | Dimeo et al. .............. 455/404.1 |
| 2010/0253535 A1* | 10/2010 | Thomas et al. .......... 340/825.24 |
| 2010/0323657 A1 | 12/2010 | Barnard et al. |
| 2010/0323660 A1 | 12/2010 | Himmelstein |
| 2010/0330972 A1 | 12/2010 | Angiolillo |
| 2011/0003578 A1 | 1/2011 | Chen et al. |
| 2011/0028118 A1 | 2/2011 | Thomas |
| 2011/0059720 A1* | 3/2011 | Penix et al. ................ 455/404.2 |
| 2011/0071880 A1 | 3/2011 | Spector |
| 2011/0098016 A1 | 4/2011 | Hatton |
| 2011/0201302 A1 | 8/2011 | Hatton |
| 2011/0202233 A1 | 8/2011 | Hatton |
| 2011/0225228 A1* | 9/2011 | Westra et al. .................. 709/203 |
| 2011/0230159 A1* | 9/2011 | Hatton ...................... 455/404.1 |
| 2011/0275321 A1 | 11/2011 | Zhou et al. |
| 2012/0028599 A1* | 2/2012 | Hatton et al. .............. 455/404.2 |
| 2012/0053782 A1* | 3/2012 | Gwozdek et al. ............. 701/31.8 |
| 2012/0264395 A1 | 10/2012 | Bradburn et al. |
| 2012/0281605 A1 | 11/2012 | Himmelstein |

OTHER PUBLICATIONS

Wayne Thalls, "Santa Cruz Ares Handbook", Santa Cruz Ares 1990, pp. 1-29.

Ford Motor Company, "SYNC with Navigation System," Owner's Guide Supplement, SYNC System Version 1 (Jul. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

(56) References Cited

OTHER PUBLICATIONS

Ford Motor Company, "SYNC," Owner's Guide Supplement, SYNC System Version 1 (Nov. 2007).
Office Action, Non-Final Rejection, dated Apr. 22, 2013.
EPO Search Report; 11153638.9-1525; mailed May 27, 2011.
PCT Search Report; PCT App. PCT/US10/027451; Mailed May 20, 2010.
PCT Search Report; PCT/US08/66878; Mailed Aug. 7, 2008.
EPO Extended Search Report; 11009966.0-2413; dated May 24, 2012.
EPO Search Report; 11154014.2-2414; dated May 31, 2011.
European MoU for Realisation of Interoperable in-Vehicle eCall; May 28, 2004; 7 Pages.
Wikipedia, "e-Call" project of the European Commission web page (e-Call—Wikipedia, the free encyclopedia).
"eCall Toolbox" web page (SafetySupport, 2005).

\* cited by examiner

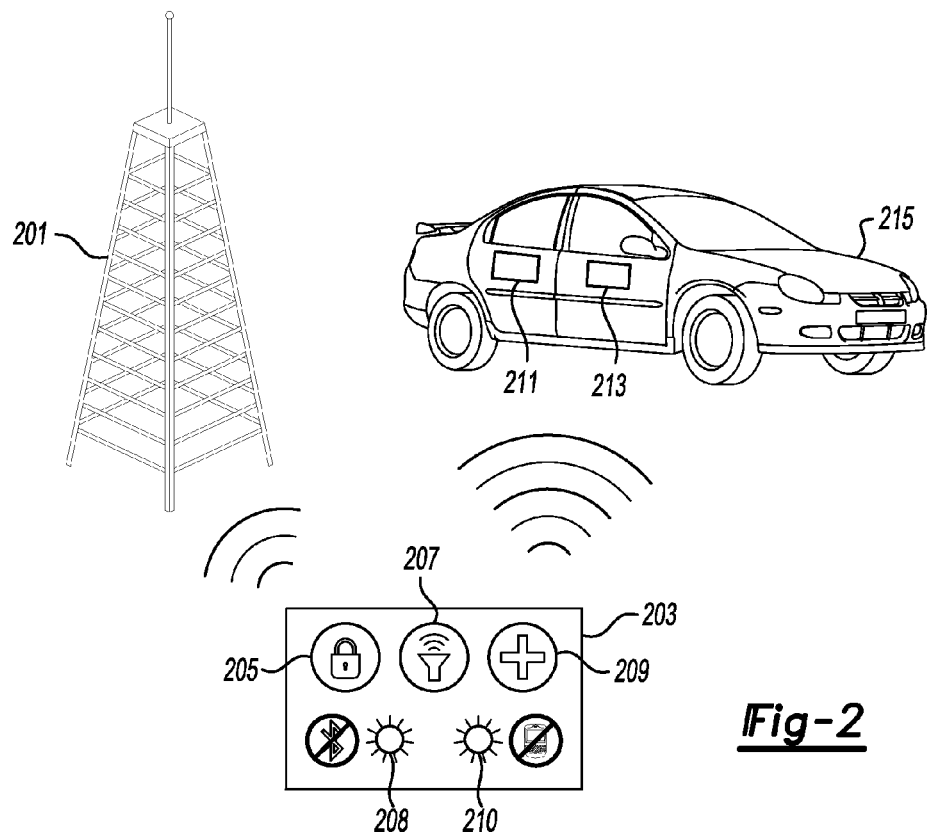
_Fig-2_
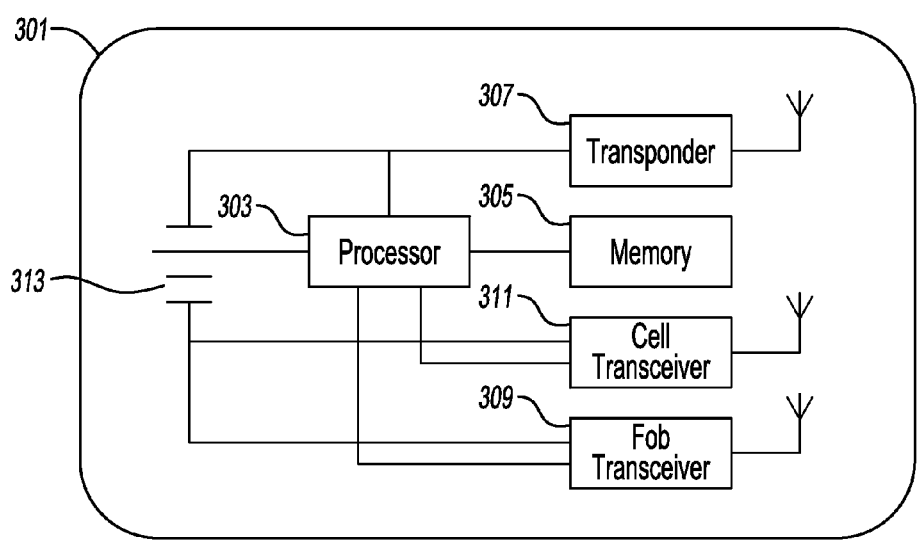
_Fig-3_

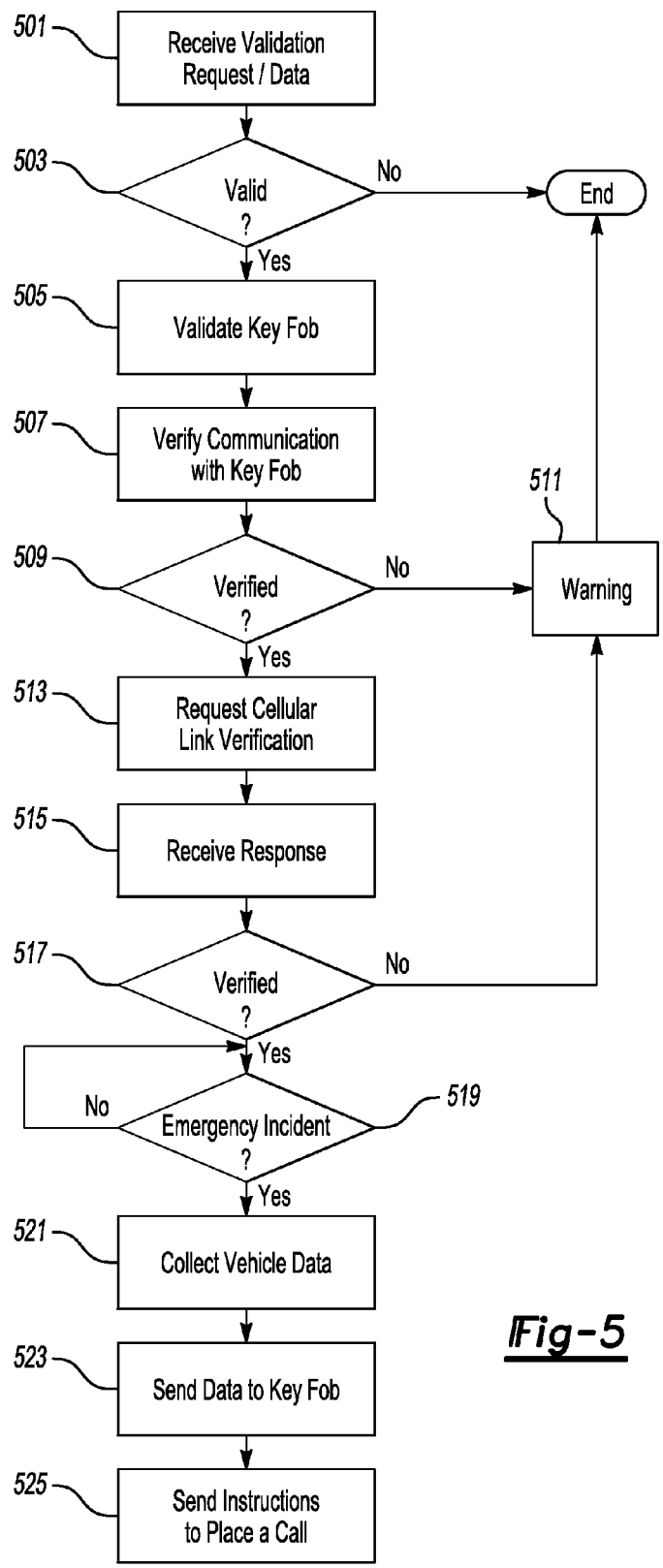

VEHICLE KEY FOB WITH EMERGENCY ASSISTANT SERVICE

TECHNICAL FIELD

The illustrative embodiments generally relate to an apparatus and method for providing emergency services within a vehicle.

BACKGROUND

Emergency assistance services provide drivers with safety and security during an emergency situation. Emergency assistance services can eliminate the need for a passenger to physically request an emergency responder. Additionally, the evolution of technology with emergency assistance services can allow responders to receive precise information in a timely manner. Responders are capable of understanding where, when, and what type of incident occurred and how to respond to the incident.

US Patent Application 2004/0183671 illustrates an emergency-use key fob communicator that automatically dials an emergency number using a cellular telephone network upon actuation of a single activation button. The key fob communicator is configured to perform only outgoing calls to a single telephone number. The number to be dialed from the key fob communicator may be restricted to preprogrammed assigned emergency numbers or to a single emergency number such as 911. To prevent inadvertent activation, the key fob communicator includes a single activation button shielded by a button guard. The single activation button assigned to dial a programmed number prevents misdialed numbers and the button guard prevents damage to the activation button and inadvertent dialing. The key fob communicator may also be capable of determining the key fob communicator's geolocation and communicating the geolocation to the receiver of an emergency call from the key fob communicator. The key fob communicator includes a sole power source internal to the key fob and is intended to be used only in emergency situations.

US Patent Application 2008/0150683 illustrates methods and wireless devices for providing secure operation of a vehicle. In one such method, a key for accessing a vehicle is detected, a vehicle operation policy associated with the key is retrieved, and operation of the vehicle consistent with the vehicle operation policy is permitted. The key may be embedded within a wireless device such as a cellular telephone. The vehicle operation policy may include an access control rule that may indicate to enable, partially enable, or disable a vehicle operation feature. Where the intended operation of the vehicle is not consistent with the access control rule, the operation may not be permitted and an enforcement action may be taken, such as disabling a feature of the vehicle.

US Patent Application 2003/0231550 illustrates a wireless key system for a mobile vehicle that includes a key fob with a controller, a microphone operably coupled to the controller, a memory operably coupled to the controller, and a telematics unit operably coupled to a vehicle communication bus. Verbal commands received through the microphone initiate the controller to send a function message in accordance with instructions stored in the memory to the telematics unit that activates a function through the vehicle communication bus.

SUMMARY

A first illustrative embodiment describes a key fob configured to communicate wirelessly with a vehicle and a communication network. The key fob further includes, a first transceiver configured to communicate data to the vehicle to allow access and operation of the vehicle and to receive data indicating that an emergency event has been detected at the vehicle. The key fob also includes a second transceiver configured to access a telecommunications network. Additionally, the key fob contains a circuit configured to cause the second transmitter to automatically dial a 911 operator in the event the data received by the transceiver indicates that an emergency event has been detected at the vehicle.

A second illustrative embodiment describes a method implemented in a key fob for contacting emergency services provider. The method includes wirelessly communicating data to a vehicle to allow access and operation of the vehicle. The method also includes verifying wireless communication with a vehicle computing system (VCS) and a cellular communication network. The method further includes receiving data from the VCS indicating an emergency event and automatically dialing a 911 operator upon receiving the data indicating the emergency event. Additionally, the method includes sending emergency data to the 911 operator.

A third illustrative embodiment describes a key fob which includes a first transmitter to communicate data to a vehicle to allow access and operation of the vehicle. The key fob also includes a receiver configured to receive emergency data from the vehicle and a second transmitter for communicating over a telecommunications network. The key fob further includes a circuit configured to cause the second transmitter to automatically dial a 911 operator in the event emergency data is received.

BRIEF DESCRIPTION OF THE DRAWINGS

FIG. 2 shows a diagram of an exemplary system for a key fob with emergency assistant service.

FIG. 3 shows an illustrative hardware diagram of a key fob with emergency assistance service.

FIG. 5 shows an illustrative flow chart of a system functional check from the perspective of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

The processes described illustratively herein can be implemented as computer code stored on a machine readable storage medium and executed by a processor. Storage medium include, but are not limited to, HDD, CDs, DVDs, RAM, ROM, flash drives, or any other suitable storage medium.

For example, without limitation, a key fob with advanced communication capabilities may be provided for emergency assistance services. The key fob can be capable of operating different ignition cycles of a vehicle and locking/unlocking doors through a transponder or a mechanical key. Additionally, the key fob can communicate with the vehicle computing system (VCS) to exchange information. Furthermore, the key fob has cellular communication capability to communicate and exchange information from the key fob to a call center through cellular communication. Finally, the key fob may also have the capability to perform a system check upon communication with the vehicle remote keyless entry (RKE) transceiver, passive anti-theft system, vehicle computing system, and/or cellular network.

Figure 1:
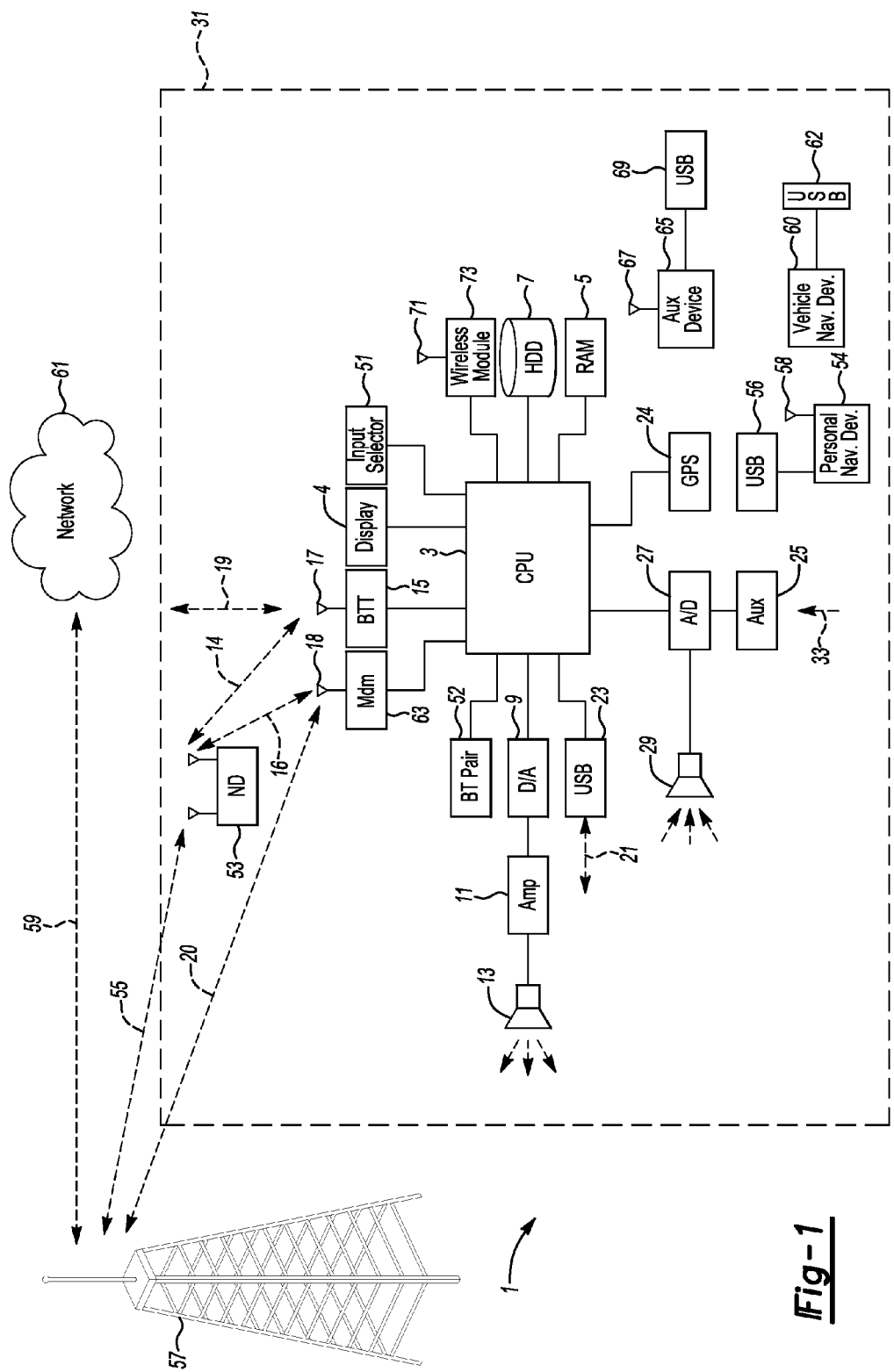
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Referring now to FIG. 2, a diagram of an exemplary system for a key fob with emergency assistant service is illustrated. The key fob 203 can be equipped with a plurality of buttons. For example, an unlock/lock button 205 may allow a vehicle to be locked or unlocked. A panic button 207 may allow a user to activate the vehicle's horn and/or headlights. An emergency activation button 209 may allow a user to initiate a call to an emergency service provider or remote server via a cellular network 201. The emergency activation button 209 may require a long press or multiple presses to prevent false activation or any other suitable alternative. The key fob's cellular network may be on various frequencies, such as GSM, UMTS, CDMA, MIMO, PMR, LTE, etc. Additionally, the key fob may be dual or multi-band. A special eSIM signature may be required for the key fob. The cellular network communication link may also utilize voice over internet protocol (VOIP). The cellular link may also be capable of generating a network eCall Flag inserted by the key fob or a vehicle's module.

The key fob 203 may also be in communication with the vehicle 215. The key fob may wirelessly communicate with a control unit 211, such as a passive anti-theft system or a remote keyless entry transceiver. The control unit 211 may compare a unique identifier sent from the key fob 203 to ensure secure wireless operation between the vehicle 215 and key fob 203 or any other suitable means of identification.

Additionally the key fob 203 may also communicate with the vehicle computing system 213. The key fob 203 can communicate with the vehicle computing system 213 through a number of communication links, both wired and wireless. Wireless links may include, but are not limited to, Bluetooth, radio frequency (RF), Wi-Fi, near field communication (NFC) etc. Wired links may include, but are not limited to, Universal Serial Bus (USB), Firewire, Serial, etc. The communication link between the key fob 203 and the vehicle computing system 213 may be useful for exchanging information during the event of an accident. For example, the vehicle computing system 213 may send data to the key fob to improve reaction from the emergency responder, such as but not limited to, GPS location of the vehicle, air-bag deployment notification, and crash notification. The key fob may also be capable of integrating with other electronic devices.

The key fob may include one or more indicators to show operability with different communication networks. The indicators may be LED, OLED, LCD, LCD, etc. Additionally, the indicator may be a tell-tale to indicate the status of the system or a simple light indicator. An illustration next to the indicator may be used to explain the purpose of the indicator to the user. In one illustrative example, the key fob may contain a first LED indicator 210 to display an error with the connection to the cellular network. If the key fob is unable to connect to the cellular network, the LED indicator 210 may light up to display the error to the user. In another illustrative example, a second LED indicator 208 may display an error with the connection to the vehicle's computing system. If the key fob cannot connect to the vehicle computing system, the second LED indicator 208 may light up to display the lack of connection to the user. The LED indicators may not only be used to display an error, but the LED indicators may also be used to display an operable connection with a communication network. Additionally, the indicators can be used to display operability or inoperability of another function, such as battery level. A combination of one or both indicators may be utilized to provide other indications to the user. For example, a flashing of both the first indicator and the second indicator may provide feedback to a user that an emergency event has occurred.

Referring now to FIG. 3, an illustrative hardware diagram of a key fob with emergency assistance service is presented. The key fob 301 may include, but is not limited to, a processing unit 303, a memory 305, a transponder 307, a cell transceiver 309, a fob transceiver 311, and a power supply 313. Different hardware configurations may exist for the key fob. Certain transceivers may be a receiver or a transmitter. Additionally, transceivers and transponders may combine functionality. Processor and memory may also be reconfigured to be in series or parallel communication with the transceivers.

The processor 303 may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination designed to perform the functions described herein, such as, but not limited to, a system functionality check. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The memory 305 may be connected with the processor or embedded as part of the processor. This memory may be used for storing the various information or data used in the determinative or selective processes, as discussed in greater detail below. The memory may also be used for storing instructions of a system functionality check, passive anti-theft unique identifiers, and unique identification flags, such as those utilized in Ford's MyKey system. The memory can be both persistent and non-persistent. Memory can include random access memory (RAM), such as but not limited to, DRAM, SRAM, T-RAM, Z-RAM, TTRAM, etc. The memory may also include read only memory, such as but not limited to, PROM, EPROM, EEPROM, etc.

The transponder 307 may be used to communicate with the vehicle's passive anti-theft system or a vehicles remote keyless entry (RKE) transceiver. The transponder 307 may communicate with the vehicle in coordination with the key fob to lock/unlock doors, activate different ignition cycles, activate trunk release, and validate custom setting features, similar to FORD'S MYKEY. The transponder 307 may be used in conjunction with a vehicle packaged with a keyless ignition system, such as but not limited to a push-start system, or a classic ignition switch that uses a mechanical key, or any other suitable alternative.

The transponder may communicate with a passive anti-theft system to allow remote keyless entry when in close proximity with a vehicle's transmitter. If the transponder replies with a valid code, the vehicle will allow access of the vehicle, such as but not limited to, locking and unlocking the door. Additionally, the valid code may allow control of the vehicle, such as, but not limited to, allowing the engine to be started. If an invalid code is sent, the access and control of the vehicle may not be allowed. A vehicle transmitter may generate a radio signal detectable by a key fob transponder when it is in close proximity to a vehicle. The key fob may also have an active transponder powered by a built-in energy source, such as a battery. The key fob may or may not include a mechanical key to operate the vehicle ignition. Additionally, the key fob may or may not have passive remote keyless entry. Alternative embodiments of the key fob may include various combinations that may or may not include a mechanical key, passive remote keyless entry, or both. In another alternative, a transmitter or transceiver may be used in place of a transponder.

The fob transceiver(s) 309 may be used to communicate with a vehicle computing system, telematics unit, instrument cluster, or any other module. The transceiver(s) 309 may be configured to communicate via wired and wireless links. Wireless links may include, but are not limited to, Bluetooth, radio frequency (RF), Wi-Fi, near field communication (NFC) etc. Wired links may include, but are not limited to, Universal Serial Bus (USB), Firewire, Serial, etc. In one illustrative embodiment, the key fob 301 may use the same communication method that is employed on the vehicle computing system. For example, if a vehicle computing system is equipped with a Bluetooth transceiver, the key fob 301 may have its own Bluetooth transceiver to conform to the vehicle computing system's data transmission protocol. The communication link between the key fob and the vehicle computing system may be utilized for exchanging information during the event of an accident. For example, the vehicle computing system may send the key fob 301 data by utilizing the communication link between the receiver(s) 309 and the vehicle. Once the vehicle computing system sends the data to the key fob 301, the data can be stored in memory 305. In one example, during an emergency situation, GPS location of the vehicle, air-bag deployment notification, and crash notification can be sent via the communication link between the receiver(s) 309 and the vehicle computing system. Additionally, the communication link between the receiver and the vehicle may be used to complete the system functionality check to confirm interoperability of the key fob and the vehicle. Alternate embodiments may utilize any or all transceiver(s) 309 as a part of receiver(s) of the key fob.

The cellular transceiver(s) 311 may be used to communicate with a cellular network. The cellular network communication link may be used to provide a direct communication link between the key fob 301 and a call center, 911 operator, Public Safety Answering Point (PSAP), etc. The call center can be utilized for numerous services, such as, but not limited to, emergency services. Following the illustrative example above, if the driver of a vehicle is in a car crash, the key fob can, in one example, automatically establish a communication link with the call center to notify the center of the accident. For example, the VCS may receive notification of an accident from a vehicle module, such as a crash notification module or an air bag module. The VCS may then notify the key fob of the accident, instruct the key fob to dial 911, etc. If the key fob 301 calls he call center or 911 operator, The key fob 301 may utilize the vehicle's microphone and speakers via a wireless or wired connection such as, but not limited to, a Bluetooth or USB connection. The driver or passenger may then be able to communicate with an operator when the key fob is in communication with the operator. In the alternative, the key fob may be equipped with a microphone and speaker in order to communicate with an operator.

The key fob 301 may be able to send data stored in the memory 305, which was sent from the vehicle computing system. The cellar network communication link can pass the same data as the vehicle communication, and vice versa. The receiver 309 located in the key fob may also be capable of transmitting data or transmitting and receiving data. Any or all cellular transceiver(s) 311 may also be included as a part of transmitter(s) in order to allow one-way communication. The data may be sent using The Vehicular Emergency Data set, which is an XML-based standard for reporting emergency data in the event of a collision. In the alternative, key fob 301 may communicate with a Public Safety Answering Point (PSAP). The PSAP may be capable of identifying the location of the key fob.

Additionally, the cellular network communication link may allow for a direct communication link between the key fob 301 and an off-board server, also known as the cloud. The cloud could be used to store driver information related to health and wellness, such as but not limited to, blood type, allergies, diabetic information, and other medical conditions. The memory can store a driver's vital information and provide to the emergency service responder with any medical conditions to tailor an emergency request.

It should be noted that the hardware design depicted in FIG. 3 is only illustrative. Other modules and features may be included besides the ones depicted. For example, the key fob 301 may include different location based modules, such as GPS, GLONASS, A-GPS, etc. The key fob 301 may also contain a speaker or microphone for audio output/input. The key fob may also contain a display, antenna, hard keys, multiple power sources, and other hardware.

Figure 4A:
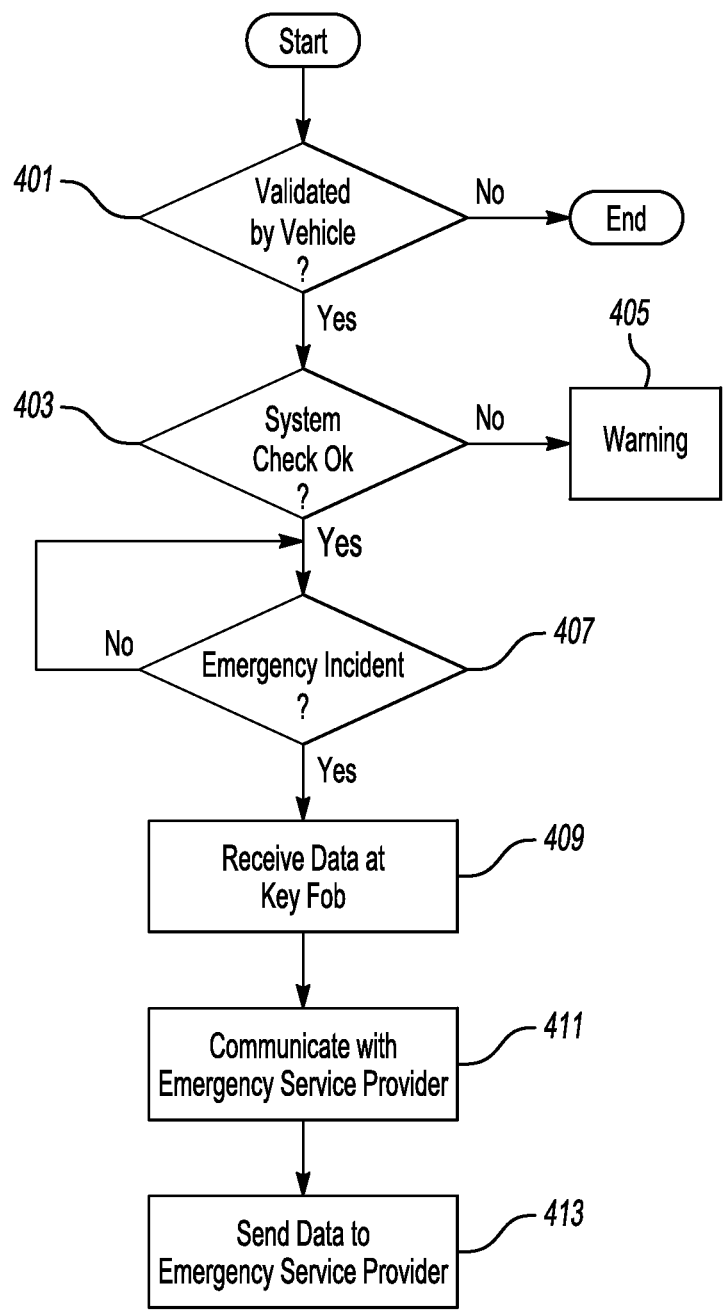
FIG. 4A shows an illustrative flowchart of operation of the emergency assistance service.

Referring now to FIG. 4A, an illustrative flowchart of operation of the emergency assistance service utilized by the cellular key fob is shown. Upon a user approaching or entering a vehicle key fob with respect to the vehicle. If an incorrect key fob tries to communicate with the anti-theft system, the anti-theft system will prevent the key fob from communicating with the particular vehicle.

Upon validation between the key fob and the anti-theft system, the key fob may begin to perform a system check 403 to ensure operability. The system check may be a test to determine if operability between the key fob, the vehicle computing system, the data communication link, and/or the cellular communication link, are all operational. If a failure is present in any of the checks, the vehicle or key fob may provide a visual or audible warning 405. For example, if a failure in Bluetooth communication between the key fob and the vehicle computing system is diagnosed, a message may appear on the vehicle computing system which states "Bluetooth communication failure with the vehicle's key fob." If the key fob passes the system check 403, there may also be an indication. For example, the vehicle computing system display may display the message "System check passed." A failure in the communication check may include other consequences such as, but not limited to, disabling the vehicle and/or other similar disablements.

Following the system check, the vehicle will monitor for an emergency incident. An emergency incident may be triggered by numerous methods. An emergency incident may be detected by both active and passive methods. One active method of detection could be presented by a manual initiation by a user. For example, a user may press a button or speak a command to indicate they are in an emergency situation. Additionally or alternatively, an example of a passive detection method may be present by an indication of a collision detection module in response to a car accident. Another illustrative example may be airbag deployment triggering a notification message to be sent from the airbag to the VCS.

If an emergency incident is detected, the key fob may receive vehicle information 409 or data from the vehicle. The transfer may be wired or wireless, depending on the communication link utilized. In one illustrative example, the key fob may receive vehicle data via a Bluetooth connection between the key fob and the VCS. The vehicle data may indicate driver information, date/time stamp, VIN, GPS coordinates of the vehicle, emergency contact information, crash notification information (i.e. airbag deployment), etc.

In the event of an emergency incident, the key fob may also communicate with an emergency service provider 411. The communication may include voice, data, or both. For example, the key fob may dial out to 911, a Public safety answering point PSAP), or emergency operator, utilizing a vehicle's hands free system to allow an emergency responder to communicate with the passengers of the vehicle. In another illustrative example, there may be no voice communication. However, the vehicle may send vehicle information to the emergency responders 413 through the cellular communication link which has a data channel. Therefore, the emergency responder may utilize the information to the tailor the response to the emergency incident.

It should also be noted that during an emergency incident, the key fob or the vehicle computing system may generate a warning to the drivers and passengers that an emergency event has been detected. The indication may be a visual or audible indication. For example, the vehicle computing system may display a message on the multimedia display. Additionally, an audible warning may be generated through the vehicle's speakers or through the key fob's speakers. Further, indicators on the key fob may be light up or flash to indicate an emergency event has occurred.

Figure 4B:
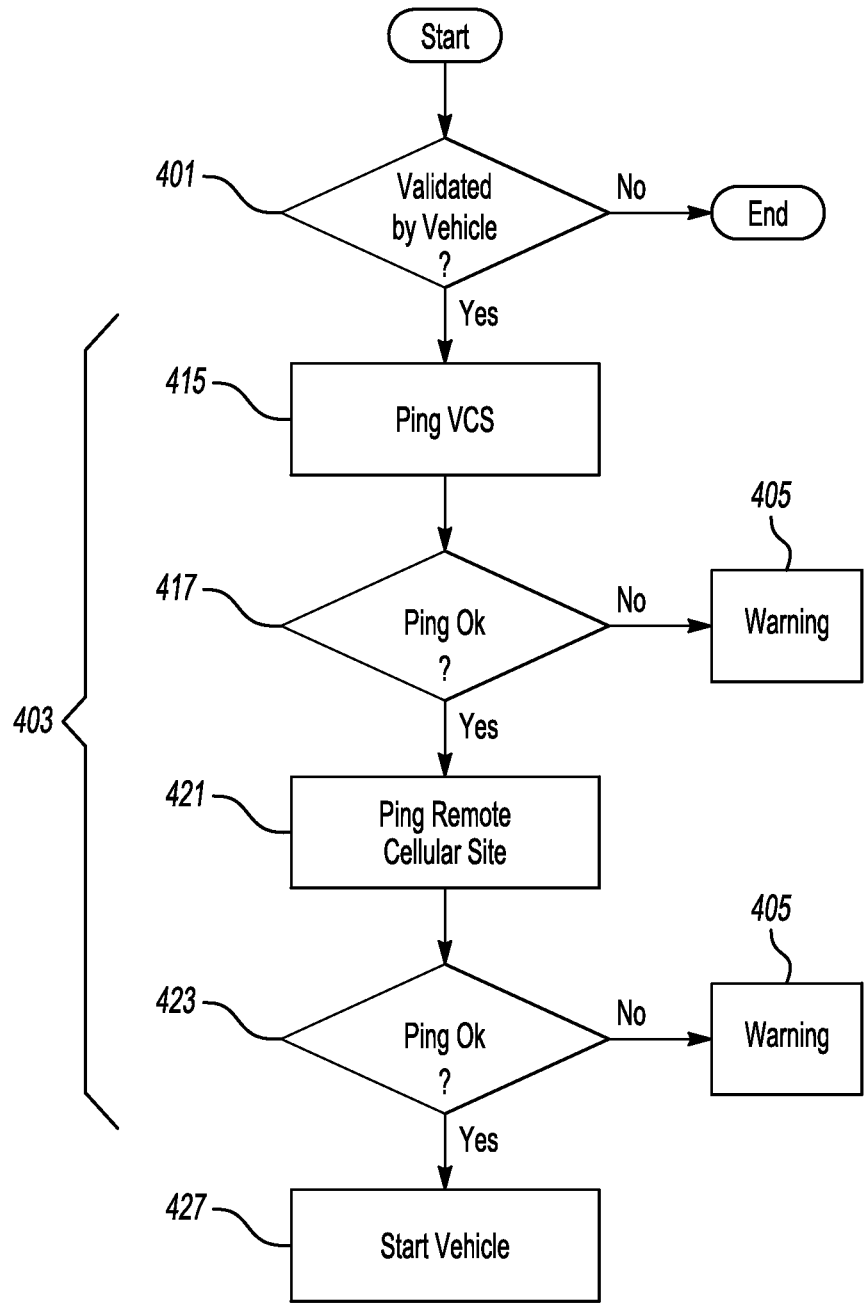
FIG. 4B shows an illustrative flow chart of a system functional check device.

Referring now to FIG. 4B, an illustrative flow chart of a system functional check is exemplified. Upon a user approaching or entering a vehicle, the key fob will communicate with the vehicle's anti-theft system 401 to ensure validation of the correct key fob with respect to the vehicle. If an incorrect key fob tries to communicate with the anti-theft system, the anti-theft system will prevent the key fob from communicating with the particular vehicle.

The system check 403 may involve a key fob pinging the vehicle computing system (VCS) 415. The key fob may send a data packet or message to the VCS via a wired or wireless communication link. Both the key fob and the VCS may be capable of initializing the pinging. The message or a data packet may include a bit assignment which the VCS may be expecting. The VCS will send back the same or similar message or data packet to the key fob. The key fob or VCS may then determine if the ping was passable 417. The ping is typically passable if the message or data packet is returned to the VCS without any error. In one illustrative example, the VCS may send back a similar message; however, it may include a bit which notifies the key fob of an error which occurred during the system check. In another illustrative example, the VCS may never return the message or data packet. Both examples would result in a ping failure. A visual or audible waning 405 may be displayed if an error occurs when the pinging occurs between the key fob and the VCS. If an error occurs, the system check may cease to continue the system check. In an alternative embodiment, the system check may not be required to be performed.

The system check 403 may also involve a key fob pinging a remote cellular site 421. The key fob may send a data packet or message to the remote cellular site via the cellular network. Both the key fob and the remote cellular site may be capable of initializing the pinging. The message or data packet may include a bit assignment which the cellular site may be expecting. The key fob may send a message to the remote cellular site via the cellular communication link. The cellular site will send back the same or similar message to the key fob. The key fob or remote cellular site may then determine if the ping was passable 423. The ping is typically passable if the message or data packet is returned to the remote cellular site without any error. In one illustrative example, the remote cellular site may send back a similar message. However, the message may include a bit which notifies the key fob of an error which occurred during the system check. In another illustrative example, the remote cellular site may never return the message or data packet. Both examples would result in the failure of the ping. A visual or audible waning 405 may be displayed if an error occurs when the pinging occurs between the key fob and the remote cellular site. If an error occurs, the system check may cease to continue the system check.

In one illustrative embodiment, the system check 403 must be passed in order for the vehicle to start 427. By requiring the system check to be completed in order to start the vehicle, this may ensure that the emergency service will function in the event of an emergency system. However, it may not be required that the system check 403 be completed or passed. In another illustrative example, the system check may not pass and the user will be provided a warning 405. The warning 405 may notify the user that the emergency services are not operational due to a failure in the system check. However, the vehicle may be operational despite the failure in the system check.

Additional steps may also be included in the system function check. For example, the function check may include a system check of the battery level of the key fob. The key fob may send its battery level data to the VCS to determine if the appropriate battery level is available on the key fob. If the battery level of the key fob is low, a warning may be displayed or announced in the vehicle. Additionally, a low battery level may result in other consequences, such as but not limited to preventing vehicle operation or requesting user feedback for acknowledgement of the warning.

Referring now to FIG. 5, an illustrative flow chart of a system functional check from the perspective of the VCS is exemplified. The VCS may request validation 501 of a key fob. Validation may occur in various methods, for example without limitation; the key fob may send a 40 bit message to the vehicle. The vehicle will be waiting for the specific 40 bit message. If the message that is sent by the key fob is the message that the vehicle is expecting, than validation of the key fob 505 will occur and operation of the vehicle is available with the key fob. In an alternate illustrative embodiment, the key fob could send a request for validation to the VCS, and the vehicle may send pseudo-code to the vehicle. The VCS will then determine if the key fob is valid 503. If the key fob is not valid, the vehicle will not operate with the key fob. However, if the key fob is validated by the VCS 505, it may have the ability operate the vehicle, such as lock/unlock doors and operate the ignition state of the vehicle. In an alternative embodiment, the validation of the key fob may not be required.

After validation of the key fob 505, the VCS may then verify the data communication with the key fob 507. In one illustrative embodiment, the VCS may verify the communication of the key fob by pinging a data packet to the key fob. The VCS will send a specific data packet to the key fob. The key fob will be expecting the data packet from the VCS. The data packet may contain a message or code which will request the key fob to send the data packet, or another data packet, to the VCS containing a specific message or code. If the VCS receives the expected data packet, the communication of the key fob and VCS is verified 509.

If the data packet does not ever reach the key fob, or returns the data packet or a new data packet to the VCS, or sends a data packet which is not expected, the communication between the VCS and the key fob will not be verified. This may result in the vehicle to not be operational. In an alternate embodiment, the vehicle may be operational; however, a warning 511 message may be announced to the user. The warning 511 may be a visual message that is displayed on the instrument cluster or multimedia display. For example without limitation, the instrument cluster may display a message which states "Communication failure between key fob and vehicle". The waning 511 could also be an audible message that is announced through the speakers utilizing text to speech or a simple chime. The warning 511 may also be a combination of an audible message and a visual message on a display.

Additionally, the verification of the data communication link may also be done periodically during operation of the vehicle to ensure that the data communication link is maintained. If the data communication link is lost, a visual warning on the multimedia display or instrument panel may indicate that the connection is lost. Additionally, an indicator on the key fob may light up or display the warning. Further, the vehicle or key fob may emit sound to indicate a failure.

The VCS may also request to verify that the cellular communication link is operational 513. The request 513 may consist of the VCS sending a message to the key fob instructing the key fob to verify the cellular communication link in a similar manner that the data communication link of the key fob and VCS was verified. For example, the key fob may ping data to the cellular network. The key fob will send a specific data packet to the remote cellular network. The cellular network may be configured to expect the data packet from the key fob. The data packet may contain a message or code which will request the remote cellular network to send the data packet, or another data packet, to the key fob containing a specific message or code. If the key fob receives the expected data packet, the communication of the key fob and the remote cellular network is verified. If the key fob can verify communication with the cellular network, the key fob may send a response message to the VCS. The VCS will receive the response 515 and verify 517 that a cellular communication link is established with the key fob and the cellular network.

The verification 517 of the cellular communication link may also be done in a different manner than pinging data between the cellular network and key fob. For example, the key fob may also verify the cellular communication link by examining the signal strength. If the signal strength meets a threshold requirement, the cellular communication link between the key fob and a remote cellular network can be verified 517 by sending a message to the VCS. Additionally, the verification of the cellular communication link may also be done periodically during operation of the vehicle to ensure that the cellular communication link is maintained. If the cellular communication link is lost, a visual warning on the multimedia display or instrument panel may indicate that the connection is lost. Additionally, an indicator on the key fob may light up or display the warning. Further, the vehicle or key fob may emit sound to indicate a failure.

If the verification 517 results in a failure, a warning 511 message may be announced to the user. The warning 511 may be a visual message that is displayed on the instrument cluster or multimedia display. For example without limitation, the instrument cluster may display a message which states "Communication failure between key fob and cellular network" or "Low signal strength of key fob". The warning 511 could also be an audible message that is announced through the speakers utilizing text to speech or a simple chime. The warning 511 may also be a combination of an audible message and a visual message on a display. Failure of the cellular service may allow the vehicle to be operable if other hardware is functioning properly.

Once the verification has been completed, the VCS may be actively awaiting an emergency incident 519. If no emergency incident is detected 519, the VCS may constantly await or monitor for an emergency incident. Detection of an emergency incident may be triggered by the VCS or a module in communication with the VCS. For example, an airbag module may be in communication with the VCS. If the airbag module is activated and an airbag is deployed, the airbag may send a message to the VCS. The VCS may store the message in memory and share the message with other devices, such as a vehicle key fob.

If an emergency incident is detected 519, the VCS may request different vehicle modules to send data to the VCS. For example, the VCS may request an electronic vehicle identification module to send VIN data to the VCS. The VCS will collect vehicle data 521 from any module which may be useful to provide to the key fob to relay to an emergency responder or 911 operators.

After completing the collection of vehicle data, the VCS may send the vehicle data to the key fob 523. Various data communication links between the VCS and key fob may be used, depending on the vehicle architecture and the key fob hardware design. For example, a key fob may use a Bluetooth receiver and the VCS can send the vehicle data over a Bluetooth connection. In another example, the key fob may be plugged into a USB port that is located in the vehicle. The VCS may send the data via the USB drive during an accident. Other communication links may be used that are both wired or wireless.

The VCS may also send instructions to place a call 525. The instructions may instruct the key fob to call a 911 operators or alternate call center. Different emergency incidents may trigger different call instructions. In one illustrative embodiment, the VCS may receive data from the airbag module that the airbag has been deployed. The VCS may assume that an emergency incident is present and send instructions to the key fob to place a call to a 911 operator. For example, if the VCS receive data from the tire pressure monitor module that the tire pressure is very low or nonexistent, it may send a request for instructions to place a call to a roadside assistance. Additionally, VCS may send instructions to send the data without actually placing a call or request the key fob to use out-of-band signaling.

The VCS may also send all or some of the vehicle data that is collected to the key fob. For example without limitation, the VCS may filter some vehicle data that it collects. The VCS may filter data that is irrelevant or useless. The filtering could reduce the size of a message traveling to and from the key fob, which in turn could reduce the amount of bandwidth utilized in an emergency situation.

Verification of the communication between the key fob, VCS, and cellular network may be done only in an initial test or could be reoccurring while the key fob and VCS are in constant communication. All the above illustrative examples may be easily modified depending on the implementation required by each manufacturer.

Figure 6:
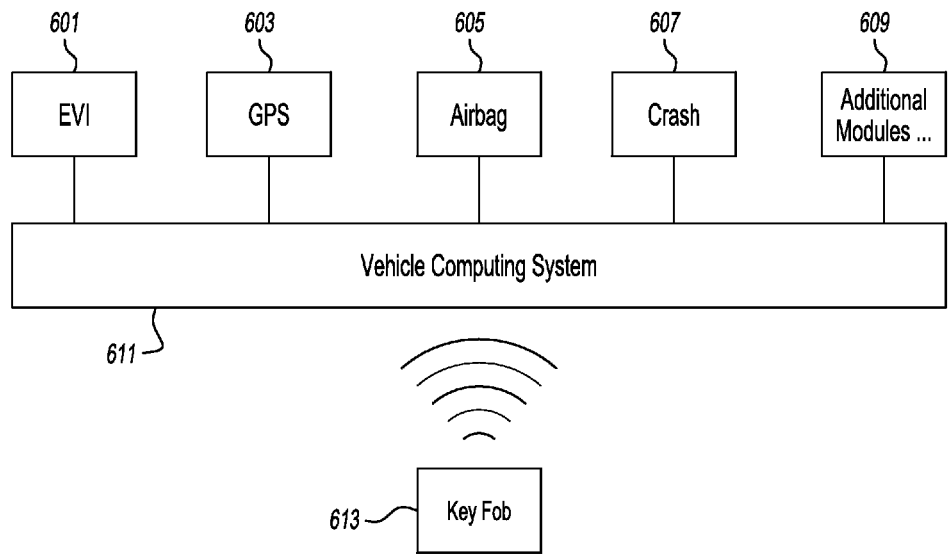
FIG. 6 shows an illustrative hardware diagram of the key fob's interaction with a vehicle computing system and other vehicle modules.

Referring now to FIG. 6, an illustrative hardware diagram of the key fob's interaction with a vehicle computing system and other vehicle modules is shown. The vehicle key fob 613 may have a wired or wireless communication link with the vehicle's vehicle computing system 611. The vehicle computing system may be in direct or indirect connection with many modules within the vehicle. In the illustrative embodiment, one module in connection with the vehicle computing system 611 is the electronic vehicle identification (EVI) module 601. The EVI may contain information such as Make, Model, Year, VIN, Owner Name, etc. The EVI may be useful in allowing a 911 operator understand who may be driving the car, the type of car involved in an accident, and other situations. The EVI may also be useful for verifying subscription services related to an emergency service or other services that may be available due to the key fob. The EVI module 601 may send the VCS 611 the data in the event of an emergency, or the VCS may request the EVI module 601 to send the data, depending on the vehicle architecture.

Another module which may be in direct communication with the vehicle computing system 611 is a GPS module 603. The GPS module 603 may contain information related to the location of the vehicle. For example, GPS module 603 may contain data related to the coordinates of a vehicle. Additionally, the GPS module 603 may contain elevation data, date, and time information. The GPS module 603 may use different radio/dead reckoning/inertial guidance/magnetic navigation systems, such as, but not limited to, GLONASS (FSS), Galileo (EU), Beidou (PRC), COMPASS (PRC), LORAN, etc. Additionally, the module may be any module which contains or calculates location data, such as GPS, A-GPS, etc. The GPS module may actively send data to the VCS 611 in the event of the emergency, or the VCS 611 may request the GPS module 611 or other modules to send specific data in the event of an emergency incident or any other scenario.

An airbag module 605 may also be in communication with the vehicle computing system 611 and the key fob 613. The airbag module 605 may send data to the vehicle computing system which contains a message that the airbag has been deployed or that the airbag has not been deployed. The data may then be sent from the vehicle computing system 611 to the key fob 613. Additionally, vehicles may have multiple airbags located throughout the vehicle. For example, side airbags and head airbags may be disposed throughout a vehicle. The airbag module 605 may be able to transmit data which details exactly which airbag has been activated. Airbag deployment notification may be useful for a 911 operator to understand the severity of emergency incident. The VCS 611 may also request the airbag module 605 to send data in the event of an emergency or other scenario.

A crash detection module 607 may also be in communication with the VCS 611 and the key fob 613. The crash detection module 607 may send data to the VCS 611 which contains a message that a crash has been detected in the vehicle. Crash detection modules 607 may be displaced throughout the vehicle, for example but not limited to, the front bumpers, rear quarter panels, and rear bumpers. The crash detection module 607 may include a airbag module 605 or can be a stand along crash detection module 607. The crash detection module may be able to send data to the VCS 611 stating where the impact has occurred in the vehicle. For example, if another vehicle strikes the local vehicle's driver side, the crash detection module 607 may send data to the VCS 611 containing a message which states that an impact has been detected on the driver side. Additionally, some crash detection modules 607 may have pressure sensors which can measure the impact. The crash detection module 607 may be able to send the VCS 611.

In the illustrative embodiment, other additional modules 609 may be in communication with the VCS 611 in order to send data to the key fob 613. The modules may be embedded on the vehicle or nomadic devices. For example without limitation, a cellular phone may be in communication with the VCS 611. During an emergency event, emergency contact information can be extracted from the cell phone to the VCS 611. The VCS 611 may then transmit the contact data for the key fob 613 to notify the emergency contact. Additionally, other signals that might be considered could include vehicle speed, engine RPM, tire pressure, brake pressure, emergency brake position, PRNDL position, ambient temperature, fuel-cutoff, accelerometer or the like. The data from each module may be sent to the VCS to relay the data to the key fob.

Figure 7:
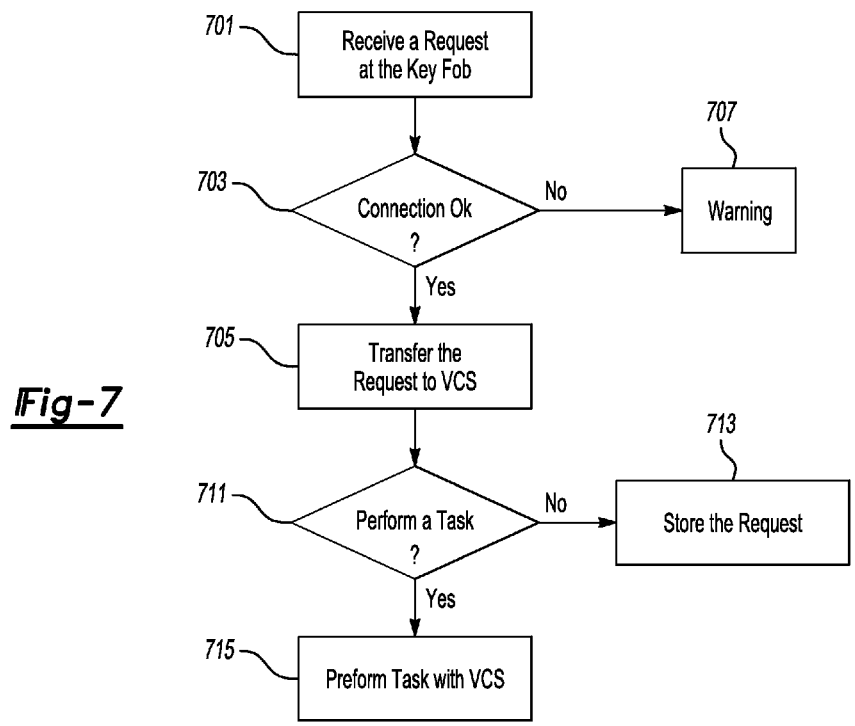
FIG. 7 shows an illustrative flow chart of a remote request towards the vehicle computing system via the key fob.

Referring now to FIG. 7, an illustrative flow chart of a remote request towards the vehicle computing system via the key fob is exemplified. A remote server may be capable of initiating a request towards the vehicle computing system. The remote server may initiate a request from a number of methods, such as, but not limited to, calling the remote server and requesting operator initiation, initiation from a web service via a cell phone, computer, tablet, or the like, utilizing an application on cell phone, computer tablet, or the like, initiation from an emergency service provider, etc. For example, if a vehicle is stolen, a user may be allowed to initiate a remote request to determine GPS coordinates or vital statistics of the vehicle. The user may call an operator associated with the server or utilize an application on their smart phone to initiate the remote request. The user may seek to request GPS coordinates of the stolen vehicle and vital statistics of the stolen vehicle. The remote server will initiate a request towards the key fob and attempt to establish communication with the VCS in order to retrieve the GPS coordinates or vital statistics of the vehicle. The key fob will receive the request 701 and attempt to retrieve the necessary data from the VCS to deliver to the remote server. In another example, the remote sever may initiate a request to the key fob without any user interaction. For example, if an Amber alert or weather alert is active, the remote server may send a request to the VCS via the key fob. The request may seek to display a warning message on the multimedia display or the instrument cluster detailing the alert. They key fob will receive the request 701 from the remote server and transfer the request to the VCS.

The connection between the key fob and VCS must be operable in order to transfer the request from the remote server. The key fob may include a verification bit to determine if the connection is passable 703 between the key fob and the VCS. The VCS may attempt to execute the second request or verification bit to transfer the remote server's request. In another illustrative example, the VCS may never receive the request from the key fob. A visual or audible waning 707 may be displayed if an error occurs between the key fob and the VCS.

The key fob may transfer the request to the VCS 705 through a wireless or wired connection. In one illustrative example, the key fob may be plugged into a USB port and transfer the request via a wired connection. In another exemplary instance, the key fob may have established a Bluetooth connection with the VCS and will transfer the request via a wireless connection. The contents of the request may vary to a message, picture file, executable file, etc. In one illustrative example, a message may have different parameters to indicate the type of emergency or alert, another bit to indicate the type indication to deliver to the user, for example, an audible or visual warning. In another illustrative example, the request may be a simple picture file which can be displayed in the vehicle. The picture file may indicate a weather map due to a weather alert in a giving area or display an AMBER alert. The request may be the exact same message or file that is received from the remote server, or it can be a different message or file. For example, the key fob may be capable of processing the message or file to accommodate the VCS with a different message or file format, reduced size of the message or file, etc.

Upon retrieval of the request at the VCS, the request may require the VCS to perform a task 711. If the VCS is unable to perform a task, it may simply store the request 713 in memory. In an illustrative example, a request from the remote server is received from the VCS via the key fob. However, the VCS is unable to initiate or execute the request. The VCS may store the parameter for diagnostic reasons. A dealership may be able to determine the error based on the request directed towards the key fob. Additionally, a request from the remote server may be a reminder that does not need to be performed by the VCS immediately. For example, the remote server may set a maintenance reminder that will need to execute at the next maintenance milestone. The VCS can store the task and perform the task when the milestone has passed. The milestones can be triggered by dates, times, mileage, etc. Furthermore, in another illustrative example, if the request is not initiated or executed by the VCS, an audible or visual warning may be communicated.

The VCS may also be required to perform a task 715 that is received from the remote server. Different tasks may require the VCS to send GPS coordinates to the remote server, establish a geo-fence around the vehicle, lock/unlock the vehicle's doors, disable the vehicle, trigger the vehicles' lights/horn, display a message or an alert, display a picture, or execute a file. In one illustrative example, the request may ask the VCS to display a message. The message may display, "On Friday, January 13$^{th}$, a remote request was initiated to locate your vehicle." In another illustrative example, the remote server's request may require the VCS to disable the vehicle. Upon retrieving the request, the VCS will communicate with the engine control unit and transfer a message to disable the vehicle. The request may also require the VCS to request other vehicle modules to perform or task, such as unlock the vehicle's door. Additionally, the request from the VCS may require the modules to send data to other modules or offboard devices.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A key fob configured to communicate wirelessly with a vehicle and a communication network, the key fob comprising:
   a first transmitter configured to communicate data directly to the vehicle to allow access of the vehicle;
   a first transceiver configured to access a telecommunications network;
   a second transceiver configured to receive data indicating that an emergency event has been detected at the vehicle; and
   a circuit configured to:
   determine whether a connection to the telecommunication network via the first transceiver can be verified;
   determine whether a connection to the vehicle via the second transceiver can be verified;
   send one or more messages to the vehicle requesting to provide an output to the vehicle indicating the absence of connection to the telecommunications network, when it is determined that the connection to the telecommunications network cannot be verified;
   provide an output indicating an absence of connection to the vehicle, when it is determined the connection to the vehicle cannot be verified;
   automatically dial a 911 operator when data received by the second transceiver indicates that an emergency event has been detected at the vehicle, when it is determined that the connection to the telecommunications network is verified and the connection to the vehicle is verified.

2. A key fob as in claim 1, wherein the key fob includes a visual indicator to provide a warning to indicate an emergency event has been detected.

3. A key fob as in claim 1, wherein the circuit is additionally configured to provide an output indicating the absence of the connection to the telecommunications network.

4. A key fob as in claim 3, wherein the output is a visual indication on the key fob.

5. A key fob as in claim 1, wherein the output indicating the absence of a connection to the telecommunications network is a visual indication on the key fob.

6. A key fob as in claim 1, wherein the key fob includes a mechanical key.

7. A key fob as in claim 1, wherein the key fob includes passive remote keyless entry.

8. A key fob as in claim 1, wherein the data received from the vehicle includes at least vehicle emergency data, vehicle GPS location, or a vehicle identification number.

9. A key fob as in claim 1, wherein the emergency event comprises deployment of an airbag, activation of a vehicle crash sensor, or activation of an emergency button.

10. A key fob as in claim 1, wherein the second transceiver is a Bluetooth transceiver.

11. A key fob as in claim 1, wherein the second transceiver is a USB transceiver.

12. A method implemented in a key fob configured to communicate wirelessly with a vehicle and a communication network, comprising:
   communicating data directly to the vehicle to allow access of the vehicle via a first transmitter;
   determining whether a connection to a telecommunication network via a first transceiver can be verified;
   sending one or more messages to the vehicle requesting to provide an output to the vehicle indicating the absence of connection to the telecommunications network, when it is determined that the connection to the telecommunications network cannot be verified;
   accessing a telecommunications network via the first transceiver, when it is determined that the connection to the telecommunications network is verified;
   determining whether a connection to the vehicle via a second transceiver can be verified;
   providing an output indicating an absence of connection to the vehicle, when it is determined the connection to the vehicle cannot be verified;
   receiving data indicating that an emergency event has been detected at the vehicle via the second transceiver, when it is determined that the connection to the vehicle is verified;
   automatically dialing a 911 operator when data received by the second transceiver indicates that the emergency event has been detected at the vehicle, when it is determined that the connection to the telecommunications network is verified and the connection to the vehicle is verified.

13. The method of claim 12, wherein the received data includes at least vehicle location, airbag deployment notification, or vehicle identification number.

14. The method of claim 12, wherein the key fob is further configured to send data to the 911 operator that includes at least vehicle location, airbag deployment notification, or vehicle identification number.

15. The method of claim 12, where in the data received is transferred via a least one Bluetooth transceiver.

16. A key-fob, comprising:
   a key-fob circuit that:
   performs verification of a telecommunications-connection to a telecommunications network and a near-field-connection to a vehicle;
   outputs a visual indication when verification is unsuccessful for the near-field-connection;
   sends a message requesting to provide vehicle multimedia output when verification is unsuccessful for the telecommunications-connection; and
   receives vehicle-emergency-data via the near-field-connection and automatically dials a 911-operator upon receiving the vehicle-emergency-data when verification for the telecommunications-connection and near-field-connection are both successful.

17. The key fob of claim 16, wherein the key-fob circuit is further configured to send vehicle-emergency-data to the 911-operator.

18. The key fob of claim 16, wherein the near-field-connection includes at least one or more of Bluetooth, radio frequency (RF), Wi-Fi, or near field communication (NFC).

* * * * *